United States Patent
Lee et al.

(10) Patent No.: US 11,763,308 B2
(45) Date of Patent: Sep. 19, 2023

(54) APPARATUS AND METHOD OF DETECTING ABNORMAL FINANCIAL TRANSACTION

(71) Applicant: KOREA UNIVERSITY RESEARCH AND BUSINESS FOUNDATION, Seoul (KR)

(72) Inventors: Kyung Ho Lee, Seoul (KR); Da Hee Choi, Seoul (KR); Jae Hee Lee, Seoul (KR); Jun Hyoung Oh, Seoul (KR); Young In You, Seoul (KR); Chae Woon Kim, Suwon-si (KR); Ju Hyeon Lee, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 1057 days.

(21) Appl. No.: 15/992,814

(22) Filed: May 30, 2018

(65) Prior Publication Data
US 2018/0357643 A1    Dec. 13, 2018

(30) Foreign Application Priority Data
Jun. 12, 2017    (KR) .......................... 10-2017-0073385

(51) Int. Cl.
*G06Q 20/40*    (2012.01)
*G06Q 20/42*    (2012.01)
*G06Q 30/0601*    (2023.01)

(52) U.S. Cl.
CPC ....... *G06Q 20/4016* (2013.01); *G06Q 20/425* (2013.01); *G06Q 30/0609* (2013.01)

(58) Field of Classification Search
None
See application file for complete search history.

(56) References Cited

U.S. PATENT DOCUMENTS

| 8,717,917 B1 * | 5/2014 | Balakrishnan .......... H04L 43/04 370/252 |
| 10,983,960 B2 * | 4/2021 | Faith .................. G06Q 30/0631 |

(Continued)

FOREIGN PATENT DOCUMENTS

| CN | 103635920 A | * | 3/2014 | ........... G06Q 20/204 |
| CN | 107871213 A | * | 4/2018 | ......... G06Q 10/0635 |

(Continued)

OTHER PUBLICATIONS

Chen et al. Machine learning techniques for anti-money laundering (AML) solutions in suspicious transaction detection: a review, https://link.springer.com/content/pdf/10.1007/s10115-017-1144-z.pdf (Year: 2018).*

(Continued)

*Primary Examiner* — El Mehdi Oussir
(74) *Attorney, Agent, or Firm* — NSIP Law

(57) ABSTRACT

Provided are a method of detecting abnormal financial transactions and an apparatus thereof. The apparatus includes: a memory in which an abnormal transaction detection program is stored; and a processor configured to execute the program. Upon execution of the program, the processor performs a data preprocessing operation to acquired payment data, extracts at least one feature adaptively determined in advance from results of the preprocessing operation, and uses the extracted feature to determine whether the payment data correspond to an abnormal transaction through a machine learning algorithm adaptively determined in advance.

11 Claims, 6 Drawing Sheets

(56) References Cited

U.S. PATENT DOCUMENTS

| | | | |
|---|---|---|---|
| 11,157,954 B1* | 10/2021 | Belanger | G06Q 30/0201 |
| 2008/0071939 A1* | 3/2008 | Tanaka | G06F 11/3419 |
| | | | 710/18 |
| 2014/0180826 A1* | 6/2014 | Boal | G06Q 30/0207 |
| | | | 705/14.66 |
| 2014/0282856 A1* | 9/2014 | Duke | H04L 63/20 |
| | | | 726/1 |
| 2015/0262185 A1* | 9/2015 | Abe | G07F 7/1083 |
| | | | 705/71 |
| 2015/0348042 A1* | 12/2015 | Jivraj | G06Q 20/326 |
| | | | 705/44 |
| 2016/0086185 A1* | 3/2016 | Adjaoute | G06Q 20/4016 |
| | | | 705/44 |
| 2016/0132886 A1* | 5/2016 | Burke | G06Q 20/3827 |
| | | | 705/44 |
| 2016/0247175 A1* | 8/2016 | Milton | G06Q 30/0205 |
| 2018/0308025 A1* | 10/2018 | Bansal | G06Q 10/0633 |
| 2019/0340684 A1* | 11/2019 | Belanger | G06N 3/0445 |

FOREIGN PATENT DOCUMENTS

| | | | | |
|---|---|---|---|---|
| JP | 5265213 B2 * | 8/2013 | | G06Q 10/0635 |
| KR | 10-1675416 B1 | 11/2016 | | |
| KR | 10-1743269 B1 | 6/2017 | | |
| KR | 101834260 B1 * | 3/2018 | | |
| KR | 20220007470 A * | 1/2022 | | |

OTHER PUBLICATIONS

Data mining for credit card fraud: A comparative study, http://didawiki.di.unipi.it/lib/exe/fetch.php/dm/bankingfraude.pdf (Year: 2011).*

Chen, Z., Van Khoa, L.D., Teoh, E.N. et al. Machine learning techniques for anti-money laundering (AML) solutions in suspicious transaction detection: a review. Knowl Inf Syst 57, 245-285 (2018). https://doi.org/10.1007/s10115-017-1144-z (Year: 2018).*

R. Gow, F. A. Rabhi and S. Venugopal, "Anomaly Detection in Complex Real World Application Systems," in IEEE Transactions on Network and Service Management, vol. 15, No. 1, pp. 83-96, Mar. 2017 print publication. https://ieeexplore.ieee.org/stamp/stamp.jsp?tp=&arnumber=8101009 (Year: 2017).*

Adewumi et al., A survey of machine-learning and nature-inspired based credit card fraud detection techniques, https://link.springer.com/article/10.1007/s13198-016-0551-y (Year: 2017).*

Park, Jae Hoon, et al., "Effective Normalization Method for Fraud Detection Using a Decision Tree." Journal of the Korea Institute of Information Security and Cryptology, Feb. 2015, pp. 133-146, vol. 25, No. 1.

* cited by examiner

*FIG. 5*

| Confusion matrix | | MACHINE LEARNING ALGORITHM RESULT | |
|---|---|---|---|
| | | NC | AC |
| ACTUAL VALUE | NC | TN(true negative) | FP(false positive) |
| | AC | FN(false negative) | TP(true positive) |

APPARATUS AND METHOD OF DETECTING ABNORMAL FINANCIAL TRANSACTION

CROSS-REFERENCE TO RELATED APPLICATION

This application claims the benefit under 35 USC 119(a) of Korean Patent Application No. 10-2017-0073385 filed on Jun. 12, 2017 in the Korean Intellectual Property Office, the entire disclosures of which are incorporated herein by reference for all purposes.

TECHNICAL FIELD

The present disclosure relates to a method of detecting abnormal financial transactions and an electronic apparatus thereof.

BACKGROUND

As channels for providing financial transaction payment services have diversified, the number of illegal use of non-face-to-face transactions has increased. Particularly, financial institutions or electronic financial business operators have provided financial products and services through a computing device, and, thus, users can use real-time financial transactions in an automated manner without face-to-face contact or communication with employees of the financial institutions or electronic financial business operators. A method for detecting and predicting fraud in non-face-to-face transaction has become increasingly important.

Most of the conventional methods for detecting abnormal financial transactions use preset rules.

In this regard, Korean Patent No. 10-1675416 (entitled "System and method for real-time detection of abnormal financial transaction") discloses a method for real-time detection of abnormal electronic financial transaction by minimizing a transaction delay.

In such a conventional method for detecting abnormal financial transactions, an abnormal transaction is detected using abnormal transaction patterns from past transaction data or statistics of past transaction data. Therefore, this method shows a high detection rate for the known abnormal transaction patterns but cannot prepare for new abnormal transaction patterns.

SUMMARY

In view of the foregoing, the present disclosure provides a method of detecting abnormal financial transactions with guaranteed high detection rate for new abnormal transaction patterns and an electronic apparatus thereof.

However, problems to be solved by the present disclosure are not limited to the above-described problems. There may be other problems to be solved by the present disclosure.

According to a first aspect of the present disclosure, an apparatus includes: a memory in which a program configured to detect abnormal financial transactions is stored; and a processor configured to execute the program. Upon execution of the program, the processor performs a data preprocessing operation to acquired payment data, extracts at least one feature adaptively determined in advance from results of the preprocessing operation, and uses the extracted feature to determine whether the payment data correspond to an abnormal transaction through a machine learning algorithm adaptively determined in advance. Herein, the at least one feature is adaptively determined from among multiple items included in the payment data on the basis of sampling rates between abnormal transaction payment data and normal transaction payment data included in payment data accumulated for a predetermined period of time and particularly on the basis of a sampling rate showing the highest detection rate among the multiple sampling rates.

According to a second aspect of the present disclosure, a method of detecting abnormal financial transactions includes: acquiring payment data and performing a data preprocessing operation to the payment data; extracting at least one feature adaptively determined in advance from results of the preprocessing operation; and using the extracted feature to determine whether the payment data correspond to an abnormal transaction through a machine learning algorithm adaptively determined in advance. Herein, the at least one feature is adaptively determined from among multiple items included in the payment data on the basis of sampling rates between abnormal transaction payment data and normal transaction payment data included in payment data accumulated for a predetermined period of time and particularly on the basis of a sampling rate showing the highest detection rate among the multiple sampling rates.

According to a third aspect of the present disclosure, a computer-readable storage medium stores a program configured to perform the method according to the second aspect on a computer.

According to the present disclosure, rea-time payment information is analyzed using adaptively determined features and a machine learning algorithm based on unsupervised learning with the features. Thus, it is possible to detect abnormal transactions according to new abnormal transaction patterns as well as abnormal transactions according to past abnormal transaction patterns.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 5 is an example diagram illustrating a confusion matrix based on an F-measure method in accordance with various embodiments described herein.

DETAILED DESCRIPTION

Figure 1:
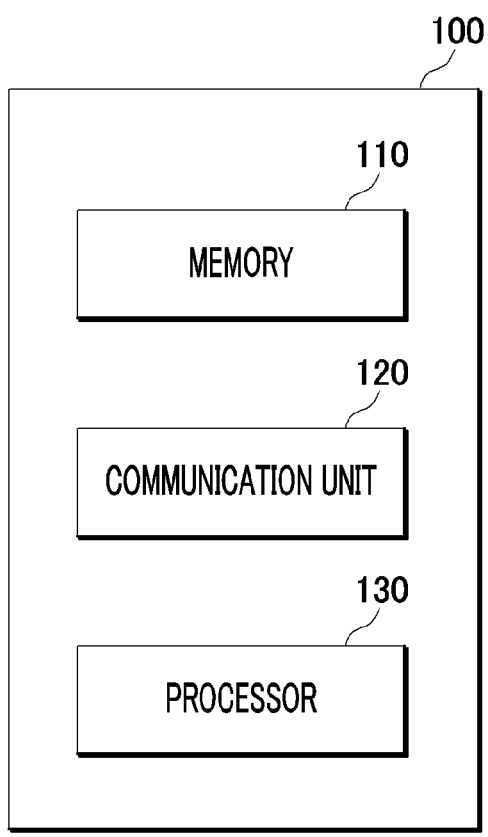
FIG. 1 is a block diagram of an abnormal financial transaction detection apparatus in accordance with various embodiments described herein.

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, it is to be understood that the term "comprises or includes" and/or "comprising or including" used in the document means that one or more other components, steps, operation and/or existence or addition of elements are not excluded in addition to the described components, steps, operation and/or elements unless context dictates otherwise.

FIG. 1 is a block diagram of an abnormal financial transaction detection apparatus 100 in accordance with an embodiment of the present disclosure. Herein, the abnormal financial transaction detection apparatus 100 is an electronic apparatus and may include various computing devices (e.g., a mobile phone, a smart phone, a tablet PC, a PDA (personal digital assistance), and the like). Hereinafter, for convenience in explanation, the abnormal financial transaction detection apparatus 100 will be referred to as "electronic apparatus 100".

The electronic apparatus 100 includes components for determining presence or absence of an abnormal transaction (or illegal transaction) by communicating with a payment system (e.g., a server provided by a value-added network (VAN) or payment gateway (PG) operator) and a financial system (e.g., a server managed by a credit card company or bank). Herein, an abnormal transaction may refer to "a payment made by another person" not intended by a user of the electronic apparatus 100.

As illustrated in FIG. 1, the electronic apparatus 100 includes a memory 110, a communication unit 120, and a processor 130.

The memory 110 stores various programs for controlling the electronic apparatus 100. For example, the memory 110 stores an abnormal payment detection program.

Herein, the memory 110 may collectively refer to a non-volatile storage device that retains information stored therein even when power is not supplied and a volatile storage device that requires power to retain information stored therein. For example, the memory 110 collectively refers to a volatile storage device and a non-volatile storage device that retains information stored therein even when power is not supplied. For example, the memory 110 may include NAND flash memories such as a compact flash (CF) card, a secure digital (SD) card, a memory stick, a solid-state drive (SSD), and a micro SD card, and magnetic computer storage devices such as a hard disk drive (HDD).

The communication unit 120 includes at least one component for communication with the payment system and the financial system. For example, the communication unit 120 may include a component capable of performing at least one of Bluetooth, Bluetooth Low Energy (BLE), infrared Data Association (IrDA), and Zigbee communications. Otherwise, the communication unit 120 may transmit and receive a wireless signal through a mobile communication network or broadcasting communication network and transmit and receive a signal through a wired communication network.

The processor 130 controls overall operations of the electronic apparatus 100. To this end, the processor 130 may include at least one of a Random Access Memory (RAM), a Read-Only Memory (ROM), a CPU, a Graphic Processing Unit (GPU), and a bus.

Further, the processor 130 executes the abnormal payment detection program stored in the memory 110 to perform a process of detecting an abnormal payment.

Hereinafter, a process of detecting an abnormal transaction by the processor 130 will be described in detail with reference to FIG. 2.

Figure 2:
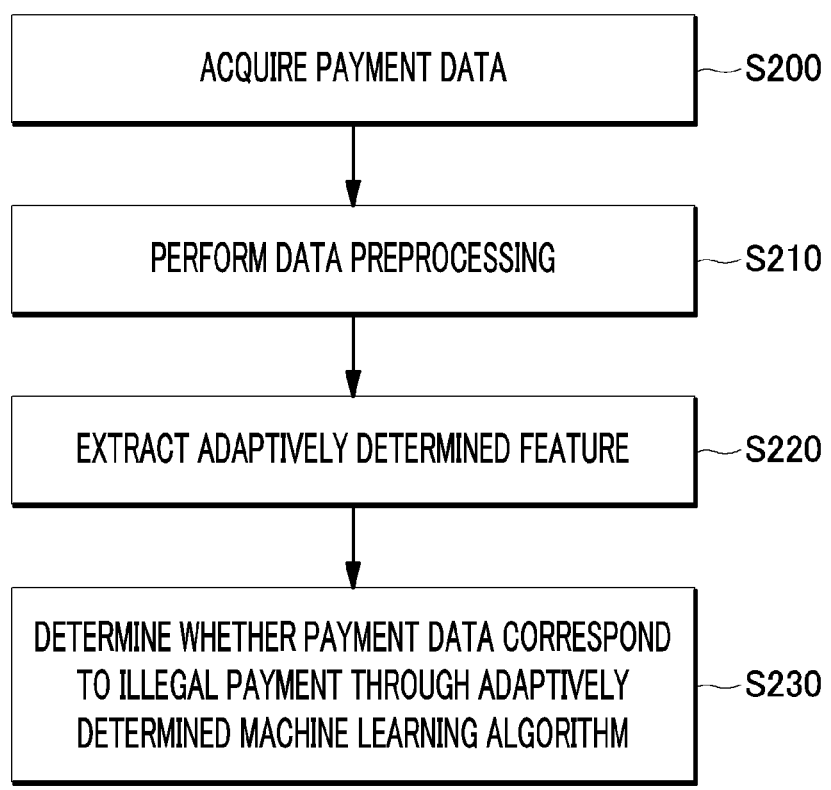
FIG. 2 is a flowchart illustrating a process of detecting an abnormal transaction in accordance with various embodiments described herein.

Referring to FIG. 2, the processor 130 acquires payment data (S200).

Herein, the payment data may be information about payment which is provided from an external server (e.g., the payment system, the financial system, etc.). The payment data may include multiple items such as payment identification information, payment means information, payment time information, payment amount information, user information, service identification information, and the like.

Then, the processor 130 performs a preprocessing operation to the acquired payment data (S210).

Each item included in the payment data may be configured as a different format such as a combination of information, a pre-arranged code, or the like and may include texts, numbers, or combinations thereof. In this case, the processor 130 may perform at least one of normalization, quantification, de-duplication, and correlation analysis of values of the respective items in the payment data as preprocessing to maximize the efficiency of an operation.

Figure 3:
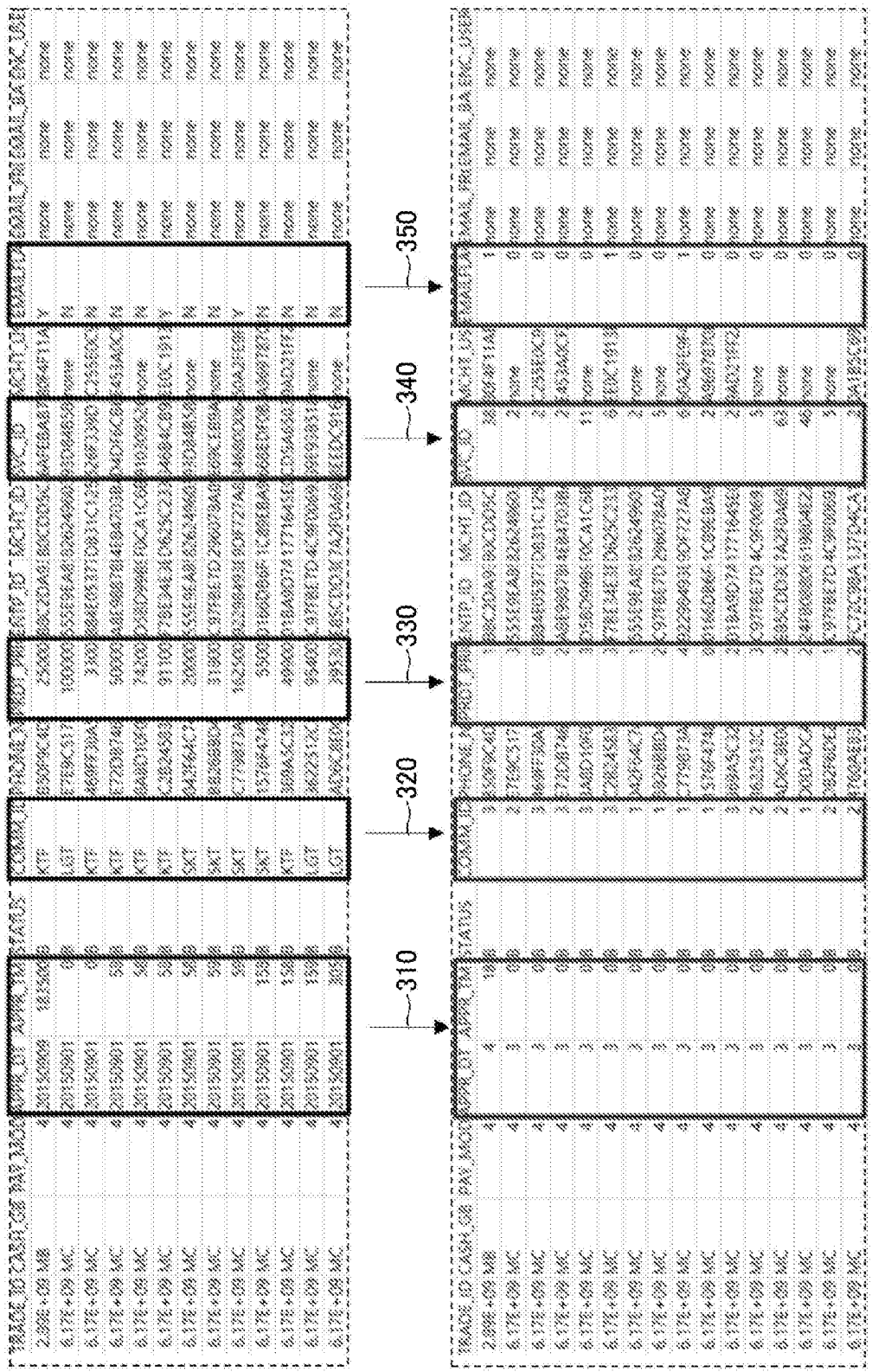
FIG. 3 illustrates a result of a preprocessing operation performed to payment data in accordance with various embodiments described herein.

For example, referring to FIG. 3, the processor 130 may perform normalization to payment time information (APPR_DT, APPR_TM) and payment amount information (PRDT_PRICE) 310 and 330, and quantification to telecommunication company information (COMM_ID), service identification information (SVD_ID), and user email existence information (EMAILFLA) 320, 340, and 350.

Then, the processor 130 extracts an adaptively determined feature (S220).

In this case, the processor 130 may extract some items from the preprocessed payment data as features.

The extracted features are determined from among the multiple items included in the payment data and determined on the basis of sampling rates between abnormal transaction payment data and normal transaction payment data included in payment data accumulated for a predetermined period of time (e.g., 24 hours, 72 hours, 1 week, etc.). Further, the extracted features are adaptively determined on the basis of a sampling rate showing the highest detection rate among the sampling rates between the abnormal transaction payment data and the normal transaction payment data included in the accumulated payment data. Furthermore, in order to minimize a transaction delay caused by detection of an abnormal transaction, these features may be determined before payment data are acquired.

Then, the processor 130 may determine whether the payment data correspond to an abnormal financial transaction through an adaptively determined machine learning algorithm (S230).

Herein, the machine learning algorithm may be previously learned using the extracted features and based on unsupervised learning.

The processor 130 inputs the features extracted from the payment data into the machine learning algorithm and then acquires a result output accordingly. This result may indicate a normal class (NC) or an abnormal class (AC). Therefore, the processor 130 may check whether the payment data correspond to an abnormal financial transaction on the basis of the result.

Meanwhile, the processor 130 may select one machine learning algorithm showing the highest detection rate for the accumulated payment data from among multiple machine learning algorithms and thus adaptively determine a machine learning algorithm. The machine learning algorithm showing the highest detection rate for the accumulated payment data may be determined before real-time payment data are acquired.

Hereinafter, a method of adaptively determining at least one feature and a machine learning algorithm by the processor 130 before payment data are acquired will be described in detail with reference to FIG. 4.

Figure 4:
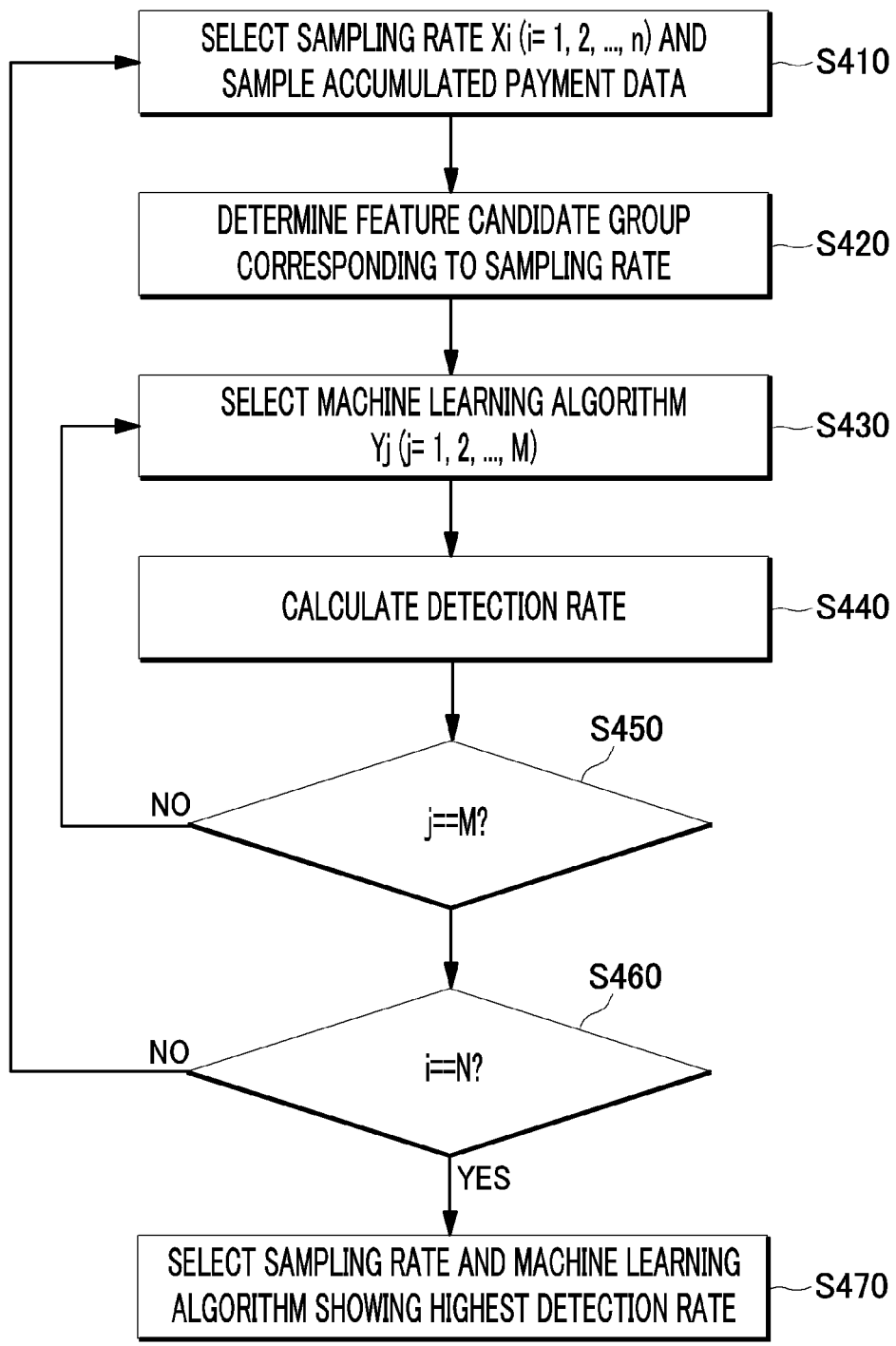
FIG. 4 is a flowchart illustrating a method of adaptively determining at least one feature and a machine learning algorithm in detail in accordance with various embodiments described herein.

Referring to FIG. 4, the processor 130 selects any one sampling rate $X_i$ (i=1, 2, ..., n) from among N number of sampling rates and samples the accumulated payment data with the selected sampling rate (S410).

For example, the processor 130 may set multiple sampling rates between abnormal transaction payment data and normal transaction payment data, such as 1:99, 5:95, 90:10, 80:20, 50:50, and the like, and may select one of N number of sampling rates. Then, the processor 130 may undersample or oversample the abnormal transaction payment data and the normal transaction payment data in the accumulated payment data with the selected sampling rate.

Undersampling or oversampling is performed to solve an imbalance between normal transaction payment data and abnormal transaction payment data and may reduce the number of payment data while minimizing the loss of information or increase data without the distortion of results. For example, the undersampling may include Easy-Ensenmble, BalanceCascade, OSS (one sided selection), and the like, and the oversampling may include SMOTE (Synthetic Minority Oversampling Technique), BSM (borderline SMOTE), ADA SYN (Adaptive Synthetic Sampling), and the like, but may not be limited thereto.

Accordingly, an imbalance between the abnormal transaction payment data and the normal transaction payment data can be solved. Further, the present method can be applied to the case where the amount of accumulated payment data is small or large.

Meanwhile, the processor 130 may determine the amount of sampling data on the basis of computing performance of the electronic apparatus 100. For example, the processor 130 may evaluate performance of the electronic apparatus 100 on the basis of predetermined reference performance and then undersamples all the normal transaction payment data and the abnormal transaction payment data with the sampling rate according to a result of the evaluation.

Then, the processor 130 may determine a feature candidate group corresponding to the sampling rate (S420).

Herein, the feature candidate group is composed of at least one feature determined corresponding to a specific sampling rate. Further, the processor 130 may determine a feature candidate group including at least one feature by applying a ranking algorithm, a filtering algorithm, or the like to the sampled accumulated payment data.

For example, the processor 130 may perform filtering and ranking to values of the respective items in the sampled accumulated payment data according to a preset frequency and may classify at least one high-ranking item as a feature candidate group. In this case, the processor 130 may assign a predetermined weight and then perform ranking.

Then, the processor 130 selects one machine learning algorithm $Y_j$ (j=1, 2, ..., m) from among M number of machine learning algorithm candidates (S430) and calculates a detection rate from a result of the selected machine learning algorithm (S440).

To this end, the processor 130 learns the selected machine learning algorithm with the feature candidate group. The machine learning algorithm is configured including a classifier that classifies input values into a normal transaction or an abnormal transaction. For example, the machine learning algorithm may be based on an unsupervised learning method such as K-means, DBSCAN, Density Estimation, Expectation Maximization, FarthestFirst, and the like. The unsupervised learning method enables learning of massive data and facilitates processing of unlearned new patterns. Therefore, it is possible to prepare for new abnormal transaction patterns by learning a machine learning algorithm based on unsupervised learning.

A result output through the machine learning algorithm may be a normal class NC which means a normal transaction or an abnormal class (AC) that means an abnormal transaction. The processor 130 may calculate a detection rate from this result on the basis of an F-measure method.

FIG. 5 is an example diagram illustrating a confusion matrix based on F-measure in accordance with an embodiment of the present disclosure.

A confusion matrix contains results of combinations between whether or not an actual value of accumulated payment data matches with a result of a machine learning algorithm (true or false) and whether the corresponding value indicates an abnormal transaction or a normal transaction (negative/positive) and shows TN (true negative), TF (true false), FN (false negative), and FP (false positive).

The processor 130 may calculate precision and recall using the confusion matrix and then calculate a detection rate from them. Herein, the precision (P value) may be calculated as $\{TP/(TP+FP)\}$ and the recall (R value) may be calculated as $\{\{TP/(TP+FN)\}$. Further, the detection rate may be calculated as $\{2X((R\ value)X(P\ value))/((R\ value)+(P\ value))\}$. For reference, a detection rate close to 1 indicates that abnormal transactions have been detected well. Further, the calculated detection rate may be stored in the memory 110.

Referring to FIG. 4 again, the processor 130 checks whether a detection rate is calculated for each of the M number of machine learning algorithm candidates (S450).

If a detection rate is calculated for each of the M number of machine learning algorithm candidates, the processor 130 checks whether a detection rate is calculated for each of the N number of sampling rates (S460).

That is, the processor 130 may calculate NXM number of detection rates from the M number of machine learning algorithm candidates learned using N number of feature candidate groups.

Then, the processor 130 selects a sampling rate and a machine learning algorithm each showing the highest detection rate (S470).

In this case, the processor 130 may select a feature candidate group corresponding to the sampling rate that shows the highest detection rate.

As such, the processor 130 can adaptively determine features having the highest abnormal transaction detection performance using a detection rate calculated by applying various sampling rates to payment data for a predetermined period of time. Further, the processor can adaptively determine a machine learning algorithm having the highest abnormal transaction detection performance with respect to the features.

Then, the processor 130 can determine whether payment data acquired in real time corresponds to an abnormal transaction using the adaptively determined features and machine learning algorithm.

Accordingly, the electronic apparatus 100 can guarantee a high detection rate for payment data and thus provide a use environment in which an abnormal transaction can be intercepted as soon as possible. Further, when the payment data are determined as an abnormal transaction, the electronic apparatus 100 can provide information about the abnormal transaction to an external server. Herein, the external server may be a financial system or payment system which can intercept abnormal transactions. For example, the processor 130 may transmit an abnormal transaction notification message containing payment identification information of the payment data to the external server through the communication unit 120. Thus, the external server may intercept the transaction or reconfirm whether or not a user of the electronic apparatus 100 proceeds with the transaction.

Figure 6:
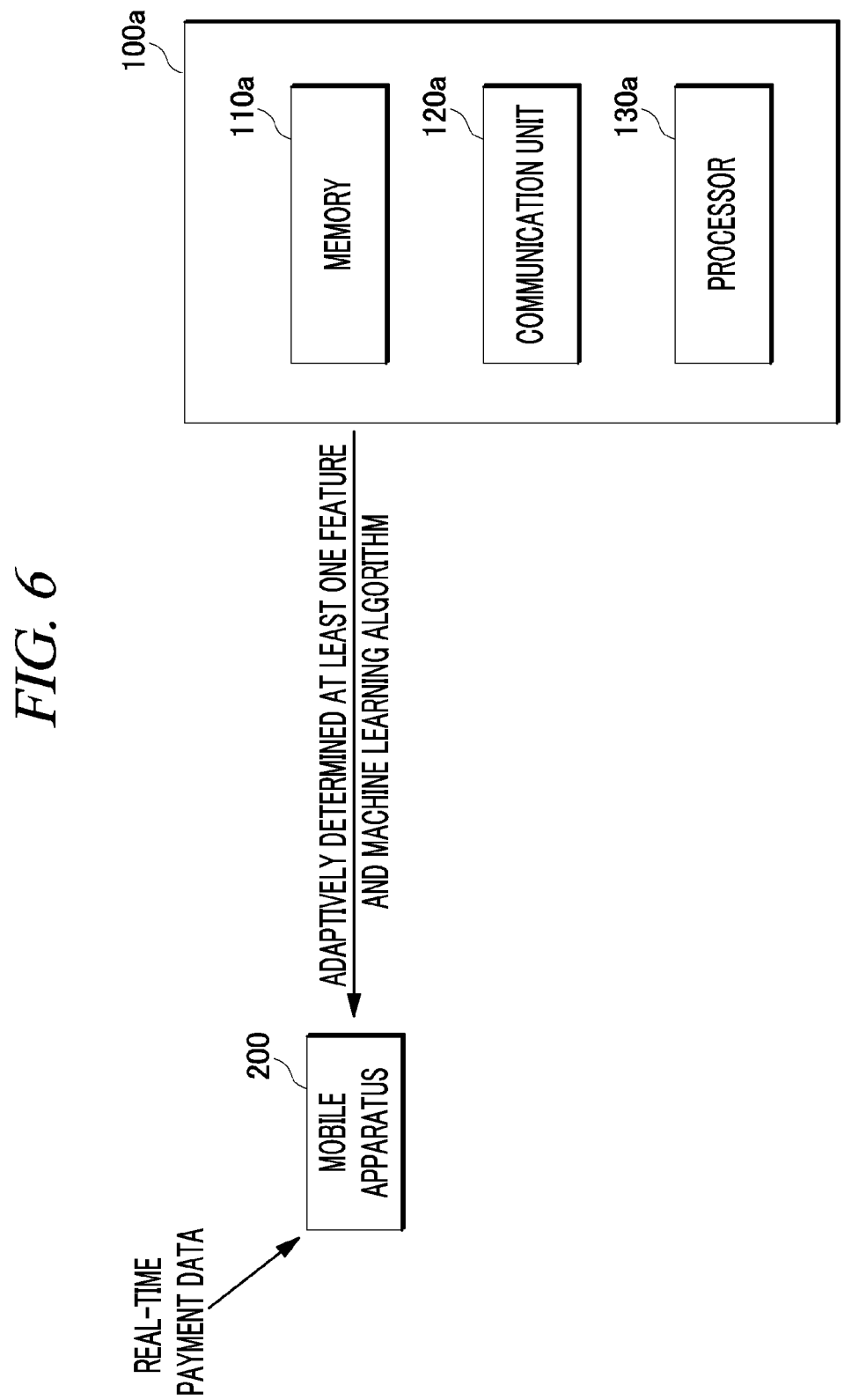
FIG. 6 is a block diagram of an abnormal financial transaction detection apparatus provided to explain a process of detecting an abnormal transaction in accordance with various embodiments described herein.

FIG. 6 is a block diagram of an abnormal financial transaction detection apparatus provided to explain a process of detecting an abnormal transaction in accordance with another embodiment of the present disclosure.

Referring to FIG. 6, an electronic apparatus (i.e., abnormal financial transaction detection apparatus) 100a according to another embodiment of the present disclosure repeatedly provides at least one feature and machine learning algorithm which are adaptively determined to a mobile apparatus 200 that receives real-time payment data. Therefore, it is possible to detect whether or not the real-time payment data received by the mobile apparatus 200 correspond to an abnormal transaction.

Specifically, if the mobile apparatus 200 acquires payment data in real time, the mobile apparatus 200 extracts a preset feature (i.e., at least one feature adaptively determined by the electronic apparatus 100a) from the payment data and inputs the extracted feature into a preset machine learning algorithm (i.e., machine learning algorithm adaptively determined by the electronic apparatus 100a). Then, the mobile apparatus 200 detects whether the payment data correspond to an abnormal transaction on the basis of a result output through the machine learning algorithm.

The components of the electronic apparatus 100a illustrated in FIG. 6 correspond to the respective components of the electronic apparatus 100 illustrated in FIG. 1. An operation of adaptively determining at least one feature and machine learning algorithm by the electronic apparatus 100a has been described above with reference to FIG. 4. Therefore, a detailed explanation thereof will not be given.

Meanwhile, the electronic apparatus 100a may be included in a payment system or a financial system. In this case, the electronic apparatus 100a may periodically determine at least one feature and machine learning algorithm and provide the determined at least one feature and machine learning algorithm to at least one mobile apparatus 200 that communicates with the system.

Further, the electronic apparatus 100a may adaptively determine at least one feature and machine learning algorithm suitable for each mobile apparatus using payment data for each mobile apparatus that communicates with the system.

The above-described method of detecting abnormal financial transactions according to an embodiment of the present disclosure can be embodied in a storage medium including instruction codes executable by a computer such as a program module executed by the computer. A computer-readable medium can be any usable medium which can be accessed by the computer and includes all volatile/non-volatile and removable/non-removable media. Further, the computer-readable medium may include all computer storage. The computer storage medium includes all volatile/non-volatile and removable/non-removable media embodied by a certain method or technology for storing information such as computer-readable instruction code, a data structure, a program module or other data.

The method and system of the present disclosure have been explained in relation to a specific embodiment, but their components or a part or all of their operations can be embodied by using a computer system having general-purpose hardware architecture.

The above description of the present disclosure is provided for the purpose of illustration, and it would be understood by a person with ordinary skill in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. An abnormal financial transaction detection apparatus, comprising:
    a memory storing a program; and
    a processor configured to execute the program, causing the processor to perform operations comprising:
    acquiring payment data in real time;
    performing a data preprocessing operation on the acquired payment data, the data preprocessing operation comprising at least one of normalization, quantification, and de-duplication of each item included in the acquired payment data;
    extracting multiple items from the preprocessed payment data as features, and extracting at least one feature adaptively determined in advance from among the extracted multiple items included in the preprocessed payment data based on:
        sampling rates between abnormal transaction payment data and normal transaction payment data included in payment data accumulated for a preset period of time, wherein the processor is configured to determine an amount of sampling data to be under-sampled or over-sampled based on computing performance of the abnormal financial transaction detection apparatus; and
        a sampling rate showing a highest detection rate among the sampling rates between the abnormal transaction payment data and the normal transaction payment data included in the accumulated payment data; and
    determining whether the acquired payment data correspond to an abnormal transaction by applying the at least one extracted feature to a machine learning algorithm adaptively determined in advance,
    wherein the extracted multiple items included in the preprocessed payment data comprise more than one information about payment identification, payment means, payment time, payment amount, user and service identification.

2. The abnormal financial transaction detection apparatus of claim 1,
wherein the processor is configured to select the machine learning algorithm showing the highest detection rate for the accumulated payment data from among multiple machine learning algorithms to adaptively determine the machine learning algorithm, and
wherein the machine learning algorithm is based on an unsupervised learning method.

3. The abnormal financial transaction detection apparatus of claim 1, wherein the processor is configured to:
sample the accumulated payment data with each of the sampling rates; and
apply a filtering algorithm and a ranking algorithm to the sampled accumulated payment data to determine multiple feature candidate groups including at least one feature, and
wherein the processor is configured to determine a feature candidate group corresponding to the sampling rate showing the highest detection rate among the sampling rates from among the multiple feature candidate groups.

4. The abnormal financial transaction detection apparatus of claim 3, wherein the processor is configured to select the machine learning algorithm showing the highest detection rate for the accumulated payment data from among multiple machine learning algorithms learned using the multiple feature candidate groups, respectively, as the machine learning algorithm adaptively determined in advance.

5. The abnormal financial transaction detection apparatus of claim 1, further comprising:
a communication unit,
wherein the processor is configured to communicate with a server that intercepts the abnormal transaction through the communication unit.

6. A processor-implemented method of detecting abnormal financial transactions by an abnormal financial transaction detection apparatus comprising a memory storing a program, and the processor configured to execute the program to detect abnormal financial transactions, the method comprising:
acquiring, by the processor, payment data in real time;
performing, by the processor, a data preprocessing operation on the acquired payment data, the data preprocessing operation comprising at least one of normalization, quantification, and de-duplication of each item included in the acquired payment data;
extracting, by the processor, multiple items from the preprocessed payment data as features, and extracting at least one feature adaptively determined in advance from among the extracted multiple items included in the preprocessed payment data based on:
sampling rates between abnormal transaction payment data and normal transaction payment data included in payment data accumulated for a preset period of time, wherein the processor is configured to determine an amount of sampling data to be under-sampled or over-sampled based on computing performance of the abnormal financial transaction detection apparatus; and
a sampling rate showing a highest detection rate among the sampling rates between the abnormal transaction payment data and the normal transaction payment data included in the accumulated payment data;
determining, by the processor, whether the acquired payment data correspond to an abnormal transaction by applying the at least one extracted feature to a machine learning algorithm adaptively determined in advance,
wherein the extracted multiple items included in the preprocessed payment data comprise more than one information about payment identification, payment means, payment time, payment amount, user and service identification.

7. The processor-implemented method of detecting abnormal financial transactions of claim 6, further comprising:
before the extracting of the at least one feature, adaptively determining, by the processor, the at least one feature,
wherein the adaptively determining of the at least one feature includes:
sampling, by the processor, the accumulated payment data with each of the sampling rates and applying a filtering algorithm and a ranking algorithm to the sampled accumulated payment data to determine multiple feature candidate groups including at least one feature; and
determining, by the processor, a feature candidate group corresponding to the sampling rate showing the highest detection rate among the sampling rates from among the multiple feature candidate groups.

8. The processor-implemented method of detecting abnormal financial transactions of claim 7, further comprising:
before the determining of whether the acquired payment data correspond to the abnormal transaction by applying the machine learning algorithm, adaptively determining the machine learning algorithm,
wherein the adaptively determining of the machine learning algorithm includes:
selecting the machine learning algorithm showing the highest detection rate for the accumulated payment data from among multiple machine learning algorithms learned using the multiple feature candidate groups, respectively, as the machine learning algorithm adaptively determined in advance.

9. The processor-implemented method of detecting abnormal financial transactions of claim 7, further comprising:
after the determining of whether the acquired payment data correspond to the abnormal transaction, when the acquired payment data are determined as the abnormal transaction, providing, by the processor, information about the abnormal transaction to an external server that intercepts the abnormal transaction.

10. The processor-implemented method of detecting abnormal financial transactions of claim 6, wherein the machine learning algorithm is based on an unsupervised learning method.

11. A non-transitory computer-readable storage medium storing a program that causes a processor configured to execute the program, causing the processor to perform operations comprising:
acquiring, by the processor, payment data in real time;
performing, by the processor, a data preprocessing operation on the acquired payment data, the data preprocessing operation comprising at least one of normalization, quantification, and de-duplication of each item included in the acquired payment data;
extracting, by the processor, multiple items from the preprocessed payment data as features, and extracting at least one feature adaptively determined in advance from among the extracted multiple items included in the preprocessed payment data based on:
sampling rates between abnormal transaction payment data and normal transaction payment data included in payment data accumulated for a preset period of time, wherein the processor is configured to determine an amount of sampling data to be under-sampled or over-sampled based on computing performance of the abnormal financial transaction detection apparatus; and a sampling rate showing a highest detection rate among the sampling rates between the abnormal transaction payment data and the normal transaction payment data included in the accumulated payment data;

determining, by the processor, whether the acquired payment data correspond to an abnormal transaction by applying the at least one extracted feature to a machine learning algorithm adaptively determined in advance, wherein the extracted multiple items included in the preprocessed payment data comprise more than one information about payment identification, payment means, payment time, payment amount, user and service identification.

\* \* \* \* \*